United States Patent
Kikuchi et al.

[11] Patent Number: 6,034,510
[45] Date of Patent: Mar. 7, 2000

[54] SECONDARY BATTERY CHARGE CONTROL DEVICE AND METHOD OF USING THE SAME

[75] Inventors: Yoshiaki Kikuchi; Fumihiko Asakawa, both of Toyota; Toshiaki Nakanishi, Toyohashi; Tadao Kimura, Kobe, all of Japan

[73] Assignee: Toyota Jidosha Kabushiki Kaisha, Toyota, Japan

[21] Appl. No.: 09/166,082

[22] Filed: Oct. 5, 1998

[30] Foreign Application Priority Data

Oct. 13, 1997 [JP] Japan .................................. 9-278796

[51] Int. Cl.[7] .......................... H01M 10/44; H01M 10/46

[52] U.S. Cl. .......................... 320/148; 320/151; 320/161

[58] Field of Search ..................................... 320/103, 104, 320/128, 135, 137, 144, 147, 148, 149, 150, 153, 161, 162, 163, 152, 151

[56] References Cited

U.S. PATENT DOCUMENTS 4,629,965 12/1986 Fallon et al. ............................. 320/156
5,570,001 10/1996 Fenley ................................. 320/161 X

FOREIGN PATENT DOCUMENTS

8-185892 7/1996 Japan .

*Primary Examiner*—Edward H. Tso
*Attorney, Agent, or Firm*—Oliff & Berridge, PLC

[57] ABSTRACT

The voltage of each of battery block of a battery is detected by a voltage sensor. Further, the temperature of the battery is detected by a temperature sensor. These detected values are supplied to a detecting section of a battery ECU. A judging section reads out the threshold value of the voltage stored in a memory, on the basis of the detected values of temperature, and compares the threshold value of the voltage with the detected voltage of each of the battery blocks. Then, if at least any one is less than the threshold value of the voltage, a relay is turned off. Furthermore, the threshold value of the voltage is arranged to be the voltage at the moment when the value of the current is suddenly increased by the discharge of a constant current of the battery.

12 Claims, 4 Drawing Sheets

SECONDARY BATTERY CHARGE CONTROL DEVICE AND METHOD OF USING THE SAME

BACKGROUND OF THE INVENTION

1. Field of the Invention

The present invention relates to the charge control of a secondary battery, and especially relates to a device by which a value of the voltage of a secondary battery is detected and the discharge is stopped when the value has reached a predetermined voltage.

2. Description of the Related Art

An electric motor car (including a hybrid powered automobile) obtaining the total or a part of the driving force of the vehicle by an electric motor, has a secondary battery (hereafter, referred to simply as a battery) mounted, and by the electric power accumulated in this battery, said electric motor is driven. Regenerative braking is a characteristic function in such electric motor cars. In regenerative braking, during vehicle braking, the kinetic energy of the vehicle is transformed into electric energy by making said electric motor function as an electricity generator. The obtained electric energy is accumulated in the battery and is reused for acceleration or other vehicle needs. Accordingly, with regenerative braking, it is possible to reuse energy which is normally radiated as thermal energy in an automobile running only by a conventional internal combustion engine, and the efficiency of the energy can considerably be improved.

Here, in order to effectively store the electric power generated during regenerative braking in a battery, it is necessary for the battery to have a corresponding capacity. Furthermore, in a hybrid powered automobile of a type in which it is possible that the generator is driven by the heat engine mounted on the automobile to generate the electric power and this electric power is accumulated in a battery, the electric power accumulated in the battery, that is, the charged amount can freely be controlled. Consequently, in such a hybrid powered automobile, it is desirable that the charged amount of a battery be controlled so that the charged amount may be approximately in the middle state (50~60%) between the state of full charge (100%) and the state of no charge (0%), so as to make it possible to receive the regenerative power, and so as to make it possible to supply the electric power to the electric motor immediately if a request is made.

Depending on the running state of a hybrid powered automobile, a situation wherein a great deal of electricity is discharged and the charged amount grows very small may arise. Often, in today's vehicles, there are cases where the battery degrades until the charged amount becomes 0. It is therefore necessary to stop the discharge before that.

Therefore, for example, in Japanese Patent Laid-Open Publication No. Hei 8-185892, a device is described by which the discharge is stopped when a secondary battery is discharged and the voltage of the battery is lowered to a specified value. Accordingly, by this device, the over discharge of a secondary battery is prevented so that the degradation of the battery may be prevented.

However, in the above device, a specified value to stop the discharge of a battery is set to a value of a proper ratio relative to the rated voltage of the battery. Therefore, in this value, a considerable margin is included, and accordingly, this results in that the discharge of a battery being stopped when discharge could still actually be performed. Consequently, it has been impossible that the ability of a secondary battery be effectively utilized to the utmost.

SUMMARY OF THE INVENTION

The present invention is made to solve the above problems, and has an object of providing a secondary battery control device by which the ability of the secondary battery can be utilized to the utmost.

The present invention is a secondary battery control device comprising: a voltage detecting means for detecting the voltage of a secondary battery; a comparing means for comparing the value of the voltage detected by this voltage detecting means and the previously set threshold value of the voltage; and a discharge stopping means which stops discharge of said secondary battery when the comparing means detects that the detected value of the voltage has reached the threshold value of the voltage, and it is characterized in that said threshold value of the voltage is set on the basis of the value of the voltage at the point at which the change of the current during the discharge of a constant electric power of said secondary battery, becomes not less than a specified value.

The point at which the change of the current during the discharge of a constant electric power becomes large is the time just before the secondary battery starts thermal runaway. By stopping discharge at this point, the over discharge of a battery can be prevented and the capacity of the secondary battery can be fully utilized. Furthermore, the time when the change of the current during the discharge of a constant electric power becomes large corresponds to the time when the voltage of a battery cell becomes ½ of the electromotive force thereof. Therefore, it is also preferable that the electromotive force of a battery cell be measured and on the basis of this, the threshold value of the voltage is determined.

Especially, in a hybrid powered automobile, high voltage batteries of approximately 300 V, are used. Accordingly, the battery is formed by connecting a number of battery cells in series. In this configuration, it is preferable that the battery be divided into blocks including a plurality of battery cells and the voltage is detected for each of these blocks, and that the discharge be stopped when the voltage of any single block reaches the threshold value of the voltage. Furthermore, it is preferable that the discharge be stopped by completely separating the battery from the load using a relay or the like. This can prevent discharge, regardless of the vehicle state.

Furthermore, the present invention is characterized in that said voltage threshold value has been determined corresponding to the service state of said secondary battery and the threshold value of the voltage to be used for the comparison is determined according to the service state of said secondary battery at that point. For example, it is preferable that the threshold value of the voltage be changed according to the temperature and the charged amount of the secondary battery. Thus, by considering the service state, it is possible to detect a more suitable point for stopping the discharge.

Furthermore, the present invention is characterized in that said service state includes at least the temperature of a battery.

DESCRIPTION OF THE PREFERRED EMBODIMENT

A preferred embodiment of the present invention (hereafter, referred to simply as the embodiment) will be described below with reference according to the drawings.

Figure 1:
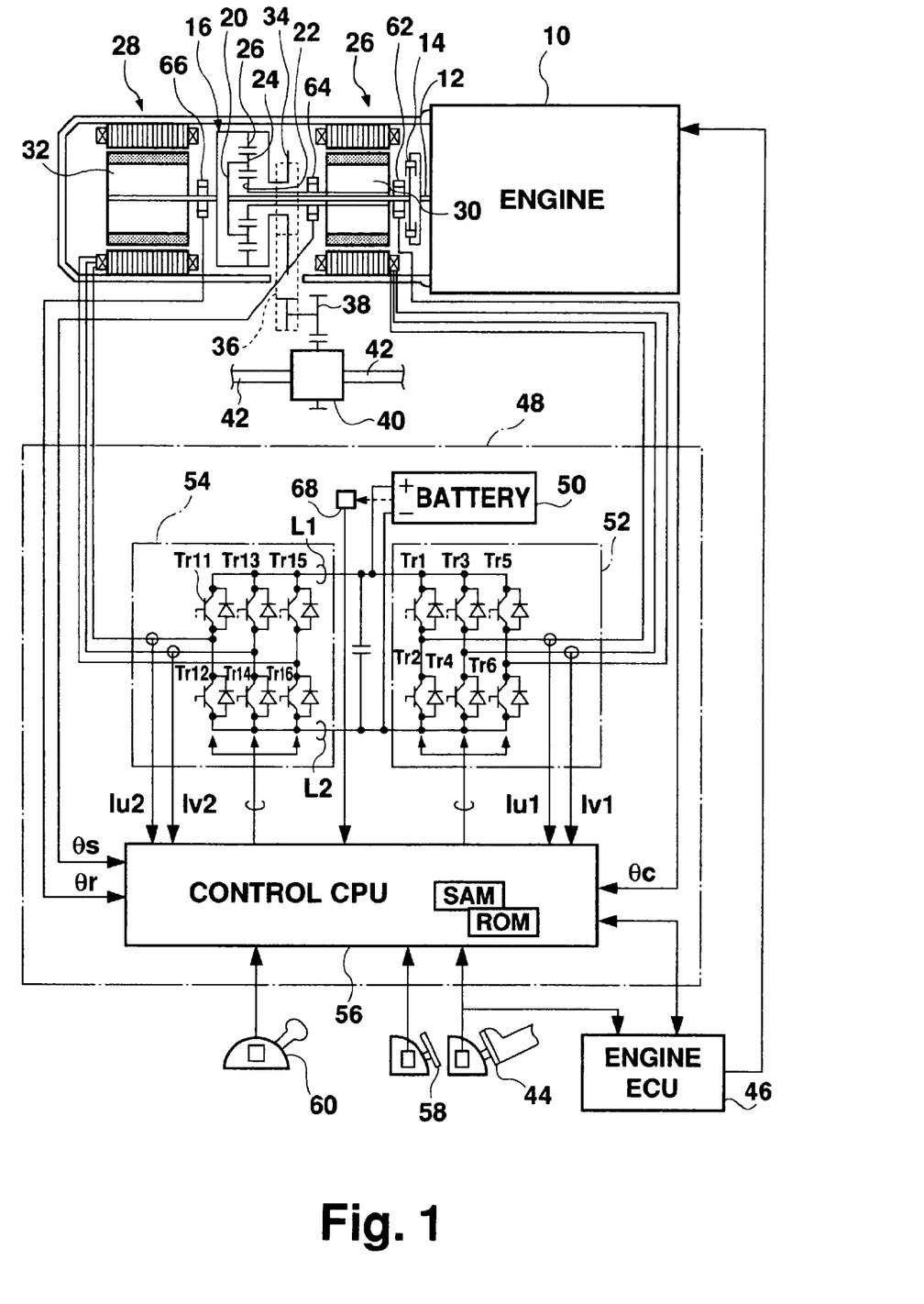
FIG. 1 is a figure showing the total arrangement of the system.

In FIG. 1, a rough figure of a power plant of a vehicle to which a secondary battery control device of the present invention is mounted, is shown. To an output shaft 12 of an engine 10, a planetary carrier 20 supporting a planetary gear 18 of a planetary gear mechanism 16 is connected through a torsional damper 14. A sun gear 22 and a ring gear 24 of the planetary gear mechanism 16 are respectively connected to rotors 30, 32 of a first motor generator 26 and a second motor generator 28. The first and second motor generators 26, 28 function as a three-phase alternating current generator or a three-phase alternating current motor. To the ring gear 24, a power take-out gear 34 is furthermore connected. The power take-out gear 34 is connected to a differential gear 40 through a chain 36 and a gear train 38. On the output side of the differential gear 40, a drive shaft 42 at the tip of which a driving wheel (not shown in the figure) is joined, is connected. By the above mentioned arrangement, the output of the engine 10 or the first and second motor generators 26, 28 is transmitted to the driving wheel, to drive the vehicle.

In the engine 10, the output power, the rotational speed, and the like thereof are controlled by an engine ECU 46 on the basis of the manipulated variable of an accelerator pedal 44, the environmental conditions such as cooling water temperature or intake pipe negative pressure, and further, the operational states of the first and second motor generators 26, 28. Furthermore, the first and second motor generators 26, 28 are controlled by a control device 48. The control device 48 includes a battery (secondary battery) which supplies the electric power to two motor generators 26, 28 and receives the electric power from them. The exchanges of the electric power between the battery 50 and the first and second motor generators 26, 28 are respectively performed through a first inverter 52 and a second inverter 54. The control of two inverters 52, 54 is performed by a control CPU 56 based on information of the operational state of the engine 10 from the engine ECU 46, the manipulated variable of the accelerator pedal 44, the manipulated variable of a brake pedal 58, the shift range determined by a shift lever 60, the state of charge of the battery, and further, the rotational angle θs of the sun gear, the rotational angle θc of the planetary carrier, and the rotational angle θr of the ring gear of the planetary gear mechanism 16, and the like. Furthermore, the rotational angles of three components of said planetary gear mechanism 16 are respectively detected by a planetary carrier resolver 62, a sun gear resolver 64, and a ring gear resolver 66. The electric power accumulated in the battery, that is, the charged amount, is calculated by a battery ECU 68. The control CPU 56 controls transistors Tr1~Tr6, Tr11~Tr16 of the first and second inverters 52, 54 on the basis of the above mentioned various conditions and the u phase and v phase electric currents Iu1, Iv1, Iu2, Iv2 of the first and second motor generators 26, 28, and further, the electric currents L1, L2 supplied from or supplied to the battery or the inverter on the other side, and the like.

The rotational speed Ns of the sun gear, the rotational speed Nc of the planetary carrier, and the rotational speed Nr of the ring gear of the planetary gear mechanism 16 are related as shown by the following expression:

Expression 1

$$Ns=Nr-(Nr-Nc)(1+\rho p)/\rho \qquad (1)$$

where ρ is the gear ratio between the sun gear and the ring gear.

That is, if two of the three rotational speeds Ns, Nc, Nr are known, the remaining rotational speed can be determined. The rotational speed Nr of the ring gear is determined by the speed of the vehicle and, therefore, if either rotational speed of the rotational speed Nc of the planetary carrier, that is, the rotational speed of the engine, or the rotational speed Ns of the sun gear, that is, the rotational speed of the first motor generator, is found, the other may be determined. Then, the field currents of the first and second motor generators 26, 28 are controlled according to the rotational speeds at that time, and whether these motor generators shall be operated as a generator or operated as a motor, is determined. If two motor generators 26, 28 consume the electric power as a whole, the electric power is brought out from the battery 50, and if they generate electricity as a whole, the battery 50 is charged. For example, when a decreasing charged amount of the battery 50 is detected by the battery ECU 68, power generation may be performed by either or both of the two motor generators 26, 28 by using a part of the torque generated by the engine 10, and the charge to the battery 50 is performed. Furthermore, when the charged amount of the battery 50 is increased, the output power of the engine 10 is a little restrained, and the second motor generator 28 is operated as a motor, and the torque generated by this is controlled so as to be used for the running of the vehicle. Furthermore, during the braking, either or both of the two motor generators 26, 28 are operated as generators, and the generated electric power is accumulated in the battery 50.

Since it is difficult to predict when the braking of an automobile will be performed, it is desirable that the battery 50 be in a state where the electric power generated by the regenerative braking can sufficiently be received. On the other hand, the battery 50 must be able to ensure a certain charged amount, for operating the second motor generator 28 as a motor when the output power of the engine 10 alone cannot achieve an acceleration desired by the driver. In order to fulfill this condition, the charged amount of the battery 50 is controlled so as to be approximately one half of the battery capacity, that is, the maximum electric power capable of being accumulated in the battery. In the present embodiment, the control is performed so that the charged amount may be approximately 60%.

Figure 2:
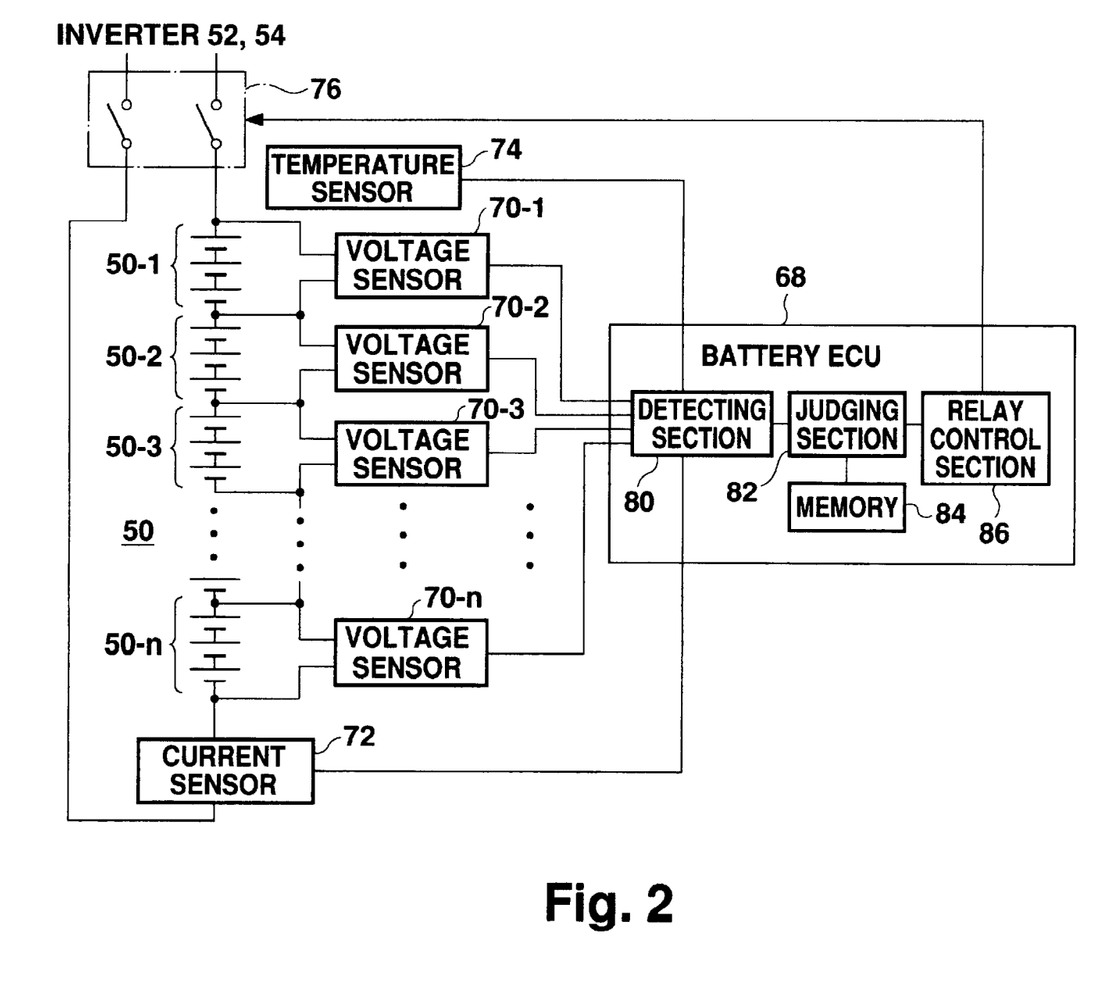
FIG. 2 is a figure showing the arrangement of the principal part.

Here, the secondary battery control device of the present embodiment will be described using FIG. 2. A voltage sensor 70 is connected to, and monitors the voltage of, the battery 50. The battery 50 is divided into a plurality of blocks 50-1~50-n, with each block itself comprising a plurality of battery cells. To the battery blocks 50-1~50-n, respective voltage sensors 70-1~70-n are connected. These voltage sensors 70-1~70-n measure the voltages of the respective battery blocks 50-1~50-n. Furthermore, at the current passage of the battery 50, a current sensor 72 is provided, and detects the current of the battery. Furthermore, near the battery 50, a temperature sensor 74 to detect the temperature thereof is provided. Furthermore, a plurality of temperature sensors 74 may also be provided so that the temperature of each of the battery blocks 50-1~50-n may individually be detected. Then, the detected values of these voltage sensors 70, current sensor 72, and temperature sensor 74 are input into the battery ECU 68. Furthermore, at the electric power line connected to the battery 50, a relay 76 is positioned, so as to separate the battery 50 from the inverters 52, 54.

Furthermore, while the battery 50 of the present description is a nickel metal hydride battery, not just a nickel metal hydride battery, but also a lithium battery, a lithium ion battery, a nickel cadmium battery, a lead acid battery, or the like can be used as the battery 50, The battery ECU 68 comprises, in its interior, functional blocks of a detecting section 80, a judging section 82, a memory 84, and a relay control section 86. The detecting section 80 supplies the value of the voltage, the value of the current, and the temperature of the battery detected by the voltage sensor 70, the current sensor 72, and the temperature sensor 74 to the judging section 82 as the digital data. Here, the value of the voltage is obtained as the detected value of each of the blocks 50-1~50-n.

The judging section 82 reads out, on the basis of the detected battery temperature, the threshold value of the voltage corresponding to that temperature from the memory 84. Here, the threshold value of the voltage stored in the memory 84 is based on the value of one battery cell. Accordingly, when compared with the voltage detected for each block, the value calculated by [the threshold value of the voltage (for the battery cell) × the number of battery cells of 1 block=the threshold value of the voltage (for the block)] is used.

There are a large number of cases where the variation among battery cells in 1 battery block cannot be neglected. Therefore, it is preferable that the threshold value of the voltage of the battery block be determined by [the threshold value of the voltage (for the block)=the threshold value of the voltage (for the cell)+the normal output voltage of the battery cell×(the number of battery cells of 1 block−1).

Then, the obtained threshold value of the voltage (for the block) and the detected value of the voltage of each block are compared, and if any one detected voltage of a block is not more than the threshold value of the voltage (for the block), the judging section 82 supplies this judgment result to the relay control section 86, and the relay control section 86 controls the relay 76 and separates the battery 50 from the inverter 52. Furthermore, when detecting the voltage of the battery 50 as the voltage sensor 70, the value calculated by [the threshold value of the voltage (for the cell)×the number of battery cells of 1 block×the number of blocks=the threshold value of the voltage (for the battery) ] is used. Furthermore, when individually detecting the voltage of each battery cell by the voltage sensor 70, the threshold value of the voltage (for the cell) may be used as it is. Furthermore, it may also be preferable to store the threshold value of the voltage (for the block) and the like in the memory 84, instead of the threshold value of the voltage (for the cell).

Consequently, the battery 50 does not further discharge, and the degradation thereof is surely prevented. Especially, by arranging the value of the voltage to be detected for each block, when the detected value is not more than the threshold value of the voltage (for the block), an accurate detection of the state of over discharge can be performed corresponding to the variation of the state of discharge for each block. Accordingly, it is unnecessary to set a considerably large margin in the threshold value of the voltage, and the full cap ability of the battery can be utilized.

Furthermore, the detected value of the current sensor 72 is utilized for detection of the charged amount of the battery 50 by the integration of the currents, and the detection of the charged amount by using the relation between the current and the voltage.

Figure 3:
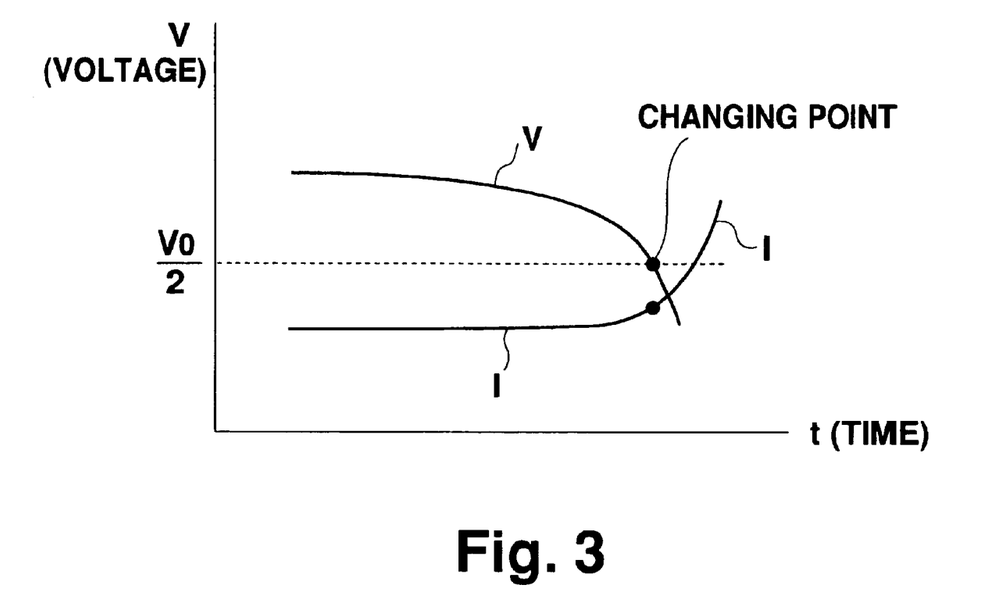
FIG. 3 is a figure showing the characteristics during the constant discharge of electric power.

The threshold value of the voltage to be stored in the memory 84 is predetermined by experiment. That is, in the present embodiment, an experiment of discharge of a constant electric power is performed, for example, on 1 battery cell, and the changes with the passage of time in the current and the voltage are measured. One example of this measurement result is shown in FIG. 3. Thus, if the discharge of a constant electric power is performed, the amount of the current is suddenly raised at a certain moment. This point is the point when the secondary battery starts the thermal runaway, and the further discharge results in the degradation of the battery. Accordingly, by stopping the discharge at this point, the discharge can be performed to the utmost without degrading the battery. This point may be detected by the fact that the time differential of the current I reaches a specified value. Then, the value of the voltage at that moment is found and this value is made to be the minimum value of the voltage of the battery cell.

Furthermore, by performing this experiment at various temperatures, the minimum value of the voltage at each temperature is found, and these values are summarized in a map, a function, or the like which is stored in the above mentioned memory 84. Furthermore, it is also possible that an experiment of discharge on a battery block be performed rather than an experiment on a battery cell.

Here, this minimum value of the voltage may be a value at the time when the voltage of a battery has become $V0/2$ (where $V0$ is the electromotive force of a battery), or a value at the time when the voltage of a battery is $½±20\%$ of the rated voltage.

Generally, the voltage V of a battery is expressed by the following expression:
Expression 2

$$V=V0-I/R \qquad (2)$$

where the electromotive force of a battery is $V0$, the current is I, and the internal resistance is R. $V0$ and R change with the charged amount, the temperature, the electric power of discharge, and the like.

Then, if I and V fulfill said relation (2), the output electric power P may be expressed by the following expression:
Expression 3

$$P=IV=-(I-V0/2R)^2+V0^2/2 \qquad (3)$$

and the output electric power P becomes the maximum when $I=V0/2R$.

Accordingly, when I and V fulfill said relation (2), the discharge can be performed by the maximum electric power at $[I=V0/2R, V=V0/2]$.

Figure 4:
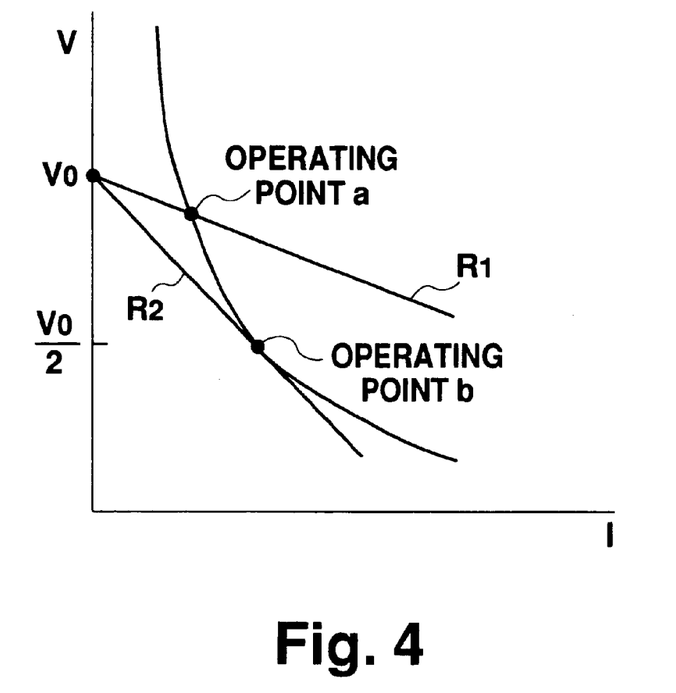
FIG. 4 is a figure showing the relation between the voltage and the current during the constant discharge of electric power.

Next, a case where the discharge is performed by a constant electric power, is considered. $V0$ and R change with discharge, but here, for the simplification, a case where $V0$ is constant, is considered. The characteristic in a case where discharge is performed by a constant electric power P ($V=P/I$), is shown in FIG. 4. On the other hand, if the internal resistance of a battery is R, $[V=RI]$ is made, and the intersection of this straight line and $[V=P/I]$ determines the current I of discharge and the voltage of the battery. If the internal resistance is R1, the current and the voltage are determined by the operating point a. Then, if the discharge progresses and the internal resistance becomes large and becomes R2, the current and the voltage are determined by the operating point b, and the voltage at this point is $V0/2$. Then, if the internal resistance becomes larger, discharge by a constant electric power cannot be performed. Consequently, the current is largely increased, and the processing of discharge by a constant electric power diverges. Accordingly, this moment when the voltage of a battery is ½ of the electromotive force V0 thereof, is the point where the amount of change of the current in FIG. 3 suddenly becomes large.

Accordingly, under the above conditions, it is suitable that the battery 50 be separated at the moment when the voltage of the battery (cell) becomes V0/2 theoretically, and it is suitable that this value is stored in the memory 84.

Furthermore, actually, the electromotive force V0 of the battery cell changes with the conditions of discharge (charged amount, temperature, or the like). Therefore, if the condition of discharge of the system is known, it is suitable that V0 is found in advance on that condition and this is stored in the memory 84. Furthermore, it is also preferable that V0's are found in advance on various conditions of discharge and these are stored in the memory 84 as a table. Consequently, it is possible that a proper V0 is read out according to the actual condition of discharge of the battery 50 and the judgment is performed.

Still furthermore, in the case of a nickel metal hydride battery, the electromotive force V0 does not significantly change, and therefore, even if V0 is arranged to be the rated voltage and a value of approximately ½ of this value is stored in the memory, significant problems do not arise. Furthermore, no problems if this value is changed by up to approximately 20%.

Processing of the Limitation of Discharge

Figure 5:
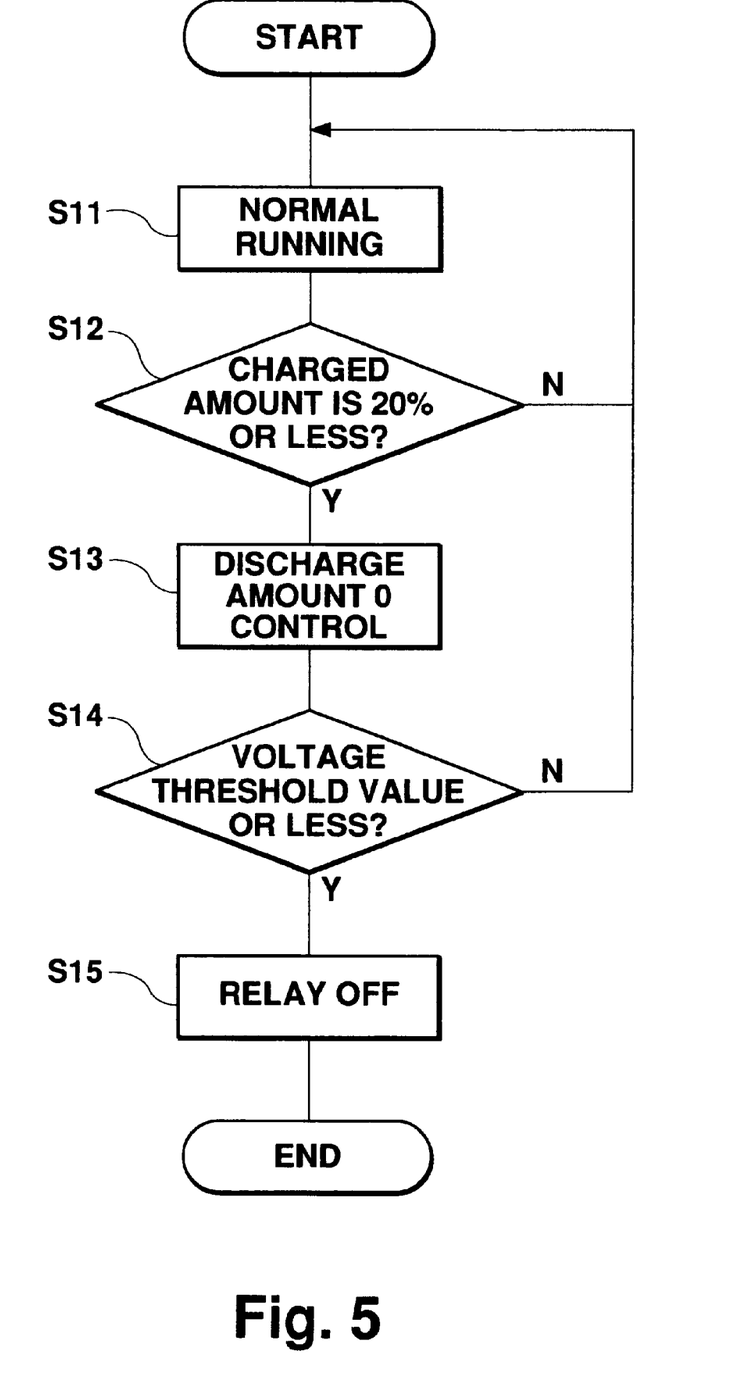
FIG. 5 is a flow chart showing the operation of the discharge control.

Next, the processing of the limitation of discharge will be described on the basis of FIG. 5. First, in a normal case, the charged amount is calculated from the amount of the current of the battery 50. Then, the driving control corresponding to the calculated charged amount is performed, and the driving is controlled so that the charged amount of the battery 50 may be approximately 60%, and normal running is performed (S11). During this normal running, whether the charged amount has reached 20%, is judged (S12). Then, if the charged amount of the battery 50 is lowered to approximately 20% according to the running condition, a driving control is performed so that the charged amount may be approximately 0 (S13). Here, from the point where the charged amount is approximately 20%, the charged amount can be calculated from the relation between the current I and the voltage V at that moment. This IV judgment is a method to grasp the absolute value of the charged amount, and the method is suitable for the judgment at S12 which judges whether the charged amount has exceeded the threshold value or not. Therefore, the judgment at S12 is performed on the basis of the IV judgment.

However, in such a driving control, the amount of discharge does not always become 0, there are also some cases where little discharge is performed. That is, although the amount of discharge is limited by the driving control of a motor generator, such a case that discharge is further performed arises according to the running condition.

Therefore, when the charged amount has become not more than 20%, it is judged from the detected values of the voltage sensors 70-1~70-n whether the voltage of any one of the battery blocks 50-1~50-n has become not more than the threshold value of the voltage (for the block) (S14). Then, if the voltage of any one has become not more than a specified value, the relay 76 is turned off and the battery 50 is separated off (S15). Consequently, the further discharge is completely stopped and the battery 50 is protected. Furthermore, even if the battery 50 is separated off, the minimum running is ensured to the vehicle by the driving force of the engine 10.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A secondary battery control device comprising:

a voltage detector that detects a voltage of a secondary battery;

a comparing circuit that compares a value of the voltage detected by the voltage detector and a previously set threshold voltage value; and a discharge stopping circuit that stops a discharge of said secondary battery when it is determined by the comparing circuit that the detected value of the voltage has reached the threshold voltage value, wherein said threshold voltage value is set on the basis of a value of the voltage at a point at which the change of the current during discharge of a constant electric power of said secondary battery becomes not less than a specified value.

2. The device according to claim 1, wherein said threshold voltage value is based on the service state of said secondary battery.

3. The device according to claim 1, further comprising a memory that stores the service state of said secondary battery and said threshold voltage value.

4. The device according to claim 3, comprising:

a service state detector that detects the service state of said secondary battery; and a read-out circuit that reads, on the basis of the service state detected by the service state detector, the corresponding threshold voltage value from said memory.

5. The device according to claim 2, wherein said service state includes at least the temperature of said secondary battery.

6. The device according to claim 1, wherein said voltage detector divides said secondary battery into a plurality of blocks and separately detects the voltage of each block, and wherein said discharge stopping circuit stops discharge of the secondary battery in a case where any one voltage is not more than the threshold value of the voltage.

7. A method for determining a discharge stopping voltage, comprising:

monitoring the discharge of a constant electric power from a battery cell, wherein a value of the voltage and a value of the current is measured, and a value of the voltage at the moment when the amount of the current starts changing is stored, and the stored value of the voltage defines the voltage to stop discharge.

8. The method according to claim 7, wherein said monitoring the discharge of a constant electric power is performed during a plurality of temperatures, and the voltages to stop discharge at a plurality of temperatures are defined.

9. A method for controlling secondary battery discharge, comprising:

detecting a voltage of a secondary battery;

comparing a value of the detected voltage to a previously set threshold voltage value; and stopping discharge of said secondary battery when the detected voltage value has reached the threshold voltage value, wherein said threshold voltage value is set on the basis of a value of the voltage at a point at which the change of the current during discharge of a constant electric power of said secondary battery becomes not less than a specified value.

10. The method according to claim 9, wherein the threshold voltage value is based on a service state of said secondary battery.

11. The method according to claim 9, further comprising storing a service state of said secondary battery and said threshold voltage value.

12. The method according to claim 11, wherein said service state includes at least the temperature of said secondary battery.

* * * * *

UNITED STATES PATENT AND TRADEMARK OFFICE
CERTIFICATE OF CORRECTION

PATENT NO. : 6,034,510
DATED : March 7, 2000
INVENTOR(S) : Yoshiaku, Kikuchi, Fumihiko Asakawa, Toshiaki Nakanishi and Tadao Kimura It is certified that error appears in the above-identified patent and that said Letters Patent is hereby corrected as shown below:

<u>Title page,</u>
The Assignee should read as follows:
-- [73] Assignees: Toyota Jidosha Kabushiki Kaisha
Toyota, Japan, and
Matsushita Electric Industrial Co., Ltd.
Kadoma, Japan --.

Signed and Sealed this

Twenty-third Day of April, 2002

Attest:

JAMES E. ROGAN
*Attesting Officer*     *Director of the United States Patent and Trademark Office*